Sept. 30, 1969     L. WEISBORD     3,470,400
SINGLE BEAM FORCE TRANSDUCER WITH INTEGRAL MOUNTING ISOLATION
Filed Dec. 21, 1967
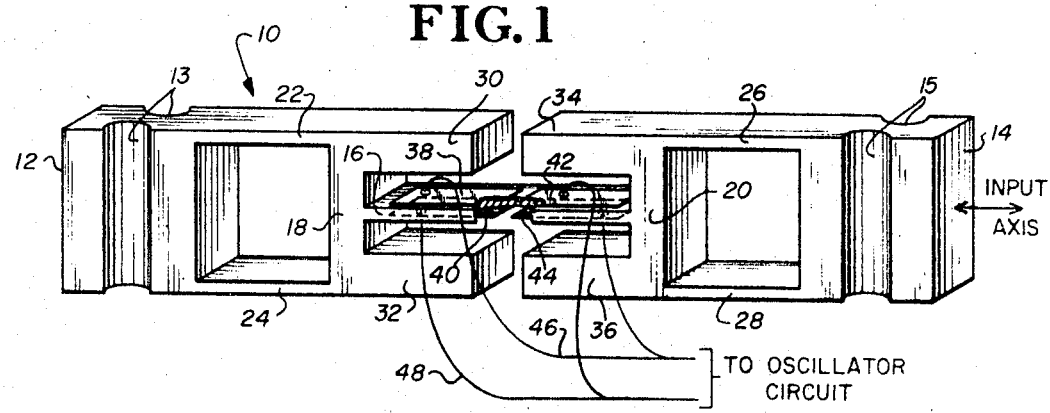
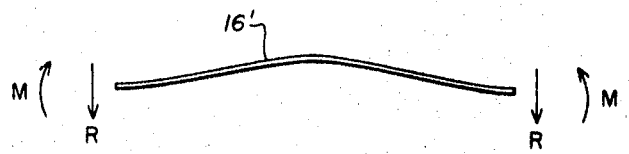
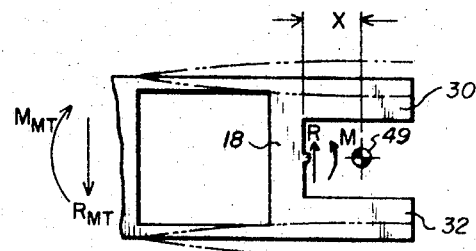
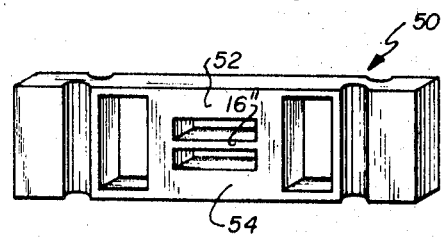
INVENTOR.
LEON WEISBORD
BY Karl A. O'Bralik
ATTORNEY

United States Patent Office 3,470,400
Patented Sept. 30, 1969

3,470,400
SINGLE BEAM FORCE TRANSDUCER WITH INTEGRAL MOUNTING ISOLATION
Leon Weisbord, New York, N.Y., assignor to Singer-General Precision, Inc., a corporation of Delaware
Filed Dec. 21, 1967, Ser. No. 692,402
Int. Cl. H02k 33/00, 35/00; H03b 5/32
U.S. Cl. 310—15                                    10 Claims

ABSTRACT OF THE DISCLOSURE

An apparatus having a vibratory member either a beam or a string and means for effectively isolating the vibratory member from its end mounts over the range of its operating frequencies to eliminate energy loss to the mounts. In one embodiment wherein the axial stresses, either tension or compression, are directly transferred to the vibratory member to affect its natural resonant frequency, isolation at vibration frequencies is effected by the cooperation of combined isolator masses and isolator springs with the vibratory member. The isolator masses comprise two extending from each end support of the vibratory member, each being coextensive with a portion of the member and with their centers of gravity projecable on the member. The pairs of masses are axially separated. The isolator springs comprise two pairs of thin, spaced resilient members, each pair interconnecting an end support of the member and an apparatus end mount.

BACKGROUND OF THE INVENTION

This invention relates to vibratory members such as beams or strings and more particularly to isolator means for isolating the vibrations of the vibratory member from its mounts to minimize coupling between the member and its mounts over the range of its frequencies of vibration.

In certain apparatus such as vibrating beam or string accelerometers, a vibratory member is supported in such a way that forces of acceleration or deceleration are applied at the ends of the apparatus to change its axial stresses. In an axially unstressed condition, a beam has a certain natural frequency of vibration, determined primarily by its dimensions the material of which it is constituted, temperature, and the media in which it is operating. In response to an axial stress applied to the beam, the beam's natural frequency of vibration changes; the frequency increasing in response to axial tension and decreasing in response to axial compression. Similarly in the case of a vibratory string apparatus, the string is prestressed a predetermined amount greater than the forces of compression it is intended to measure. In such a condition it has a certain natural resonant frequency. Axial forces of either compression or tension applied to the ends of the apparatus produce changes in this natural frequency of vibration indicative of the forces so applied.

It is, of course, desirable that the vibration frequency of the vibratory member be a true and accurate representation of the axial stress applied to it. However, in prior art apparatus of this type, this is not the case. A certain mounting problem exists in that it is difficult to mount the member without seriously degrading its performance. There is an energy loss at the mount due to the existence of a mounting interface that, in the case of a beam, must resist the forces and moments generated by the vibrating member and, in the case of a string, must resist the forces generated. This results in a decrease in the Q factor of the resonator, that is, the ratio of energy stored to the ratio of energy lost. The frequency stability of the resonator is degrated by the decrease in Q. Moreover, instabilities of the mount result in further instabilities in the operation of the resonator.

In addition, in a single vibratory member resonator, it is directly coupled to the mount so that the frequency of the resonant member is affected by any structural resonances of the member to which the member is mounted. This effect can further seriously degrade the operation of the member. It can limit its operation frequency range and degrade its frequency stability. Moreover, the resonant member becomes sensitive to external vibrations imposed on the housing at any of the housing resonances; and its temperature coefficient of frequency is affected by the housing temperature coefficient.

One proposal which has been offered to overcome the disadvantages noted above has been the double vibrating member structure wherein the members theoretically vibrate in a push-pull type of action. An attempt is made to construct two members, either beams or strings, identical in size; and the members are mounted parallel to each other. Ideally, the vibrations are such that the members move either simultaneously toward or away from each other whereby end effects are cancelled. However, as a practical matter the double resonator as an axial stress measuring unit has operating difficulties when an external axial load is applied. If the two members are not loaded equally, the frequency shift due to the externally applied load will be unequal. Under these conditions there will not be a single well-defined resonant frequency but rather two, one for each member. The existence of two resonant peaks can change the frequency versus load characteristic and can sometimes result in the vibrating members' electronic drive circuitry gain falling to less than one. This results in the failure of the oscillator loop circuitry to maintain vibrations of the members. Moreover, the beneficial cancelling effects of the double member configuration are dependent on closely matching the dimensions of the two members. If matching is not very close, the cancellation benefits decrease.

Accordingly, ideally, the vibratory member's vibration and its changes in vibration should be totally uninfluenced by its mounts whereby its changes in vibration would be directly related to the axial stresses applied to it. In such a case, an accurate, reliable accelerometer or other instrument free of interference from its supports could be implemented.

SUMMARY OF THE INVENTION

In accordance with the present invention, mechanical isolation or decoupling between a vibratory member and its end mounts is effected by cooperative action between isolator masses and isolator springs associated with a vibratory member. The member is secured at respective ends to a pair of supports; and the isolator masses comprise two pairs of massive elements, one pair secured to respective ends of each of the member's supports and extending therefrom coextensively with a portion of the member so that the center of gravity of each pair as an entity is within or projects upon the member. The isolator springs comprise thin, elastic elements connecting the vibratory member supports to the apparatus mounts on each end of the entire unit. The masses and springs form resonant combinations driven into vibration by the end forces and moments of a beam or forces of a string. By properly proportioning the masses and springs according to the properties of the vibratory member, the member can be nearly totally decoupled from its mounts at the member's frequencies of vibration.

In accordance with another embodiment of this invention, a frequency reference beam structure is provided by forming an apparatus as described hereinabove but with only two isolator masses, one on each side of the vibratory member, coextensive with it and secured at respective ends to the member's end supports. In this construction, decoupling occurs as already described and in addition, axial stresses are borne by the isolation members rather than by the vibratory member whereby the vibratory member vibrates at a constant frequency.

Other objects and many additional advantages will be more readily understood by those skilled in the art after a detailed consideration of the following specification taken with the accompanying drawings.

BRIEF DESCRIPTION OF THE DRAWING

FIGURE 1 is a perspective view of the vibratory beam apparatus with decoupling structure according to one form of this invention and adaptable for use in an accelerometer;

FIGURE 2 is a view of a vibratory beam in a displaced position with arrows representing directions of reaction forces and reaction moments acting on the beam;

FIGURE 3 is a fragmentary view of the beam structure of FIGURE 1, showing the range of displacement of an isolator mass and reactive forces and moments on the vibratory beam and on the beam mounts; and FIGURE 4 is a perspective view of a frequency reference structure having decoupling means according to this invention.

DESCRIPTION OF THE PREFERRED EMBODIMENTS

The present invention is equally applicable to vibratory apparatus having vibratory beams or vibratory strings; however, for simplicity and clarity, its application as a vibratory beam apparatus only, will be described in detail, it being understood that generally the same or similar principles apply in the case of a vibratory string apparatus.

Referring now to FIGURE 1 of the drawings for a detailed description of the invention, 10 represents generally an entire vibratory beam apparatus of this invention, including a pair of end mounts 12 and 14 which may be respectively recessed at 13 and 15 to form cross axis hinges and to which supporting members are attached and to which axial forces are applied along an input axis designated, when the unit is used as a force measuring unit as in an accelerometer. The apparatus 10 includes a vibratory beam 16 extending between and secured to respective support members 18 and 20.

In accordance with a feature of the invention, for decoupling or isolating the beam from mounts 12 and 14 at beam operating frequencies, support members 18 and 20 are connected to respective mounts 12 and 14 by pairs of spaced, thin spring members 22 and 24 and 26 and 28 and pairs of isolator masses 30 and 32 and 34 and 36 extend from respective supports 18 and 20 coextensively with a portion of the beam 16. The particular lengths and other dimensions of the masses are correlated with the beam properties, however, in all events the masses 30 and 34 are axially spaced and masses 32 and 36 are similarly axially spaced. Axial stresses, either tension or compression, applied to the end mounts 12 and 14 are transmitted to the beam 16 through the thin spring members 22 and 24 and 26 and 28.

The beam apparatus 10 may be formed from a single block of any suitable material. However, for the sake of clarity, the invention will be set forth as applied to an apparatus made of quartz or other piezoelectric material wherein to form the particular configuration shown and described, material is cut away by any suitable well-known procedure.

For driving the beam 16 in the body shear mode, pairs of electrodes 38 and 40 are attached to opposite sides of the beam along one axial extent and another pair of electrodes 42 and 44 are attached to opposite sides of the beam along another axial extent. An electronic oscillator, not shown, may provide driving excitation for the beam and leads 46 and 48 from the oscillator are connected to the electrodes. Lead 46 is connected to electrodes 38 and 44, and lead 48 is connected to electrodes 40 and 42.

Thus, the electrical excitation applies oppositely directed transverse electric fields through the beam at axially spaced locations. In a manner described in detail in copending application of Frank Norris, Ser. No. 622,988, for Piezoelectric Force Transducer, filed Mar. 14, 1967 and assigned to the present assignee, this described construction and electrical excitation is effective to produce vibration in the beam. It is to be understood, however, that the beam may be driven by other means, the particular one described being only representative and preferred for particular situations.

The manner in which the isolator springs and isolator masses are effective in decoupling the beam from the mounts may be better understood and appreciated by reference to FIGURES 2 and 3 of the drawing in connection with the following description.

In FIGURE 2, 16′ represents a momentary posture of a beam such as beam 16 in FIGURE 1 in vibration, the deflections being exaggerated to aid in understanding the actions involved. The supports for the beam are replaced by forces R and moments M which such supports produce on the beam. Such a beam when deflected at locations intermediate to its ends, such as an "up" deflection in FIGURE 2, has reaction force moments in the directions indicated by arrows. The reaction forces, R, are directed oppositely to the beam's deflection and the reaction moments, M, are in such a direction as to tend to twist the ends of the beam about an axis perpendicular to the paper and tending to oppose the deflection. The forces and moments applied by the beam into the supports vary at the frequency of the beam's vibration and have magnitudes depending on the beam's size and on its amplitude and frequency of vibration. They tend to shake the mounts to which they are secured and, in prior art apparatus, result in energy losses for this reason. However, in accordance with the present invention, the reaction forces and reaction moments are attenuated so as to effectively isolate the beam from the end mounts. The isolator masses and isolator springs combinations respond to the reaction forces and moments as shown in this figure whereby the isolator masses move up and down as viewed in FIGURE 3 and as represented by the broken lines at the resonant frequency of the beam. If the natural resonant frequency of the isolator section in this direction is lower than the natural resonant frequency of the beam, then the transmissibility to the interface which is the ratio of reaction force at the mounting surface $R_{Mt}$, to the reaction force at the beam R can be made to be very small. The transmissibility can be approximated by the equation:

$$T = \frac{R_{Mt}}{R} = \frac{1}{\left(\frac{f}{f_i}\right)^2 - 1}$$

wherein T is the interface transmissibilty, $f$ is the beam resonant frequency and $f_i$ is the isolator resonant frequency. By properly proportioning elements with respect to each other, it can be seen that the ratio $R_{Mt}/R$ can be made very small and as a result render insignificant the energy losses due to forces applied by the beam.

In accordance with this invention, the moments applied by the beam may also be rendered insignificant so as to also render insignificant the energy losses due to such moments.

The motion of each isolator mass in a vertical direction as viewed in FIGURE 3, results in an inertial force directed oppositely to R and approximately equal to R. Thus, $$m_1 \ddot{y} \cong R$$

wherein $m_1$ represents the isolator mass and $\ddot{y}$ represents acceleration of the center of gravity of this mass. Since the isolator mass is deemed to be concentrated at its center of gravity, 49, which is spaced a distance, X, from the point of application of the force R, the combination of forces R and $m_i\ddot{y}$ results in a couple that acts opposite to the end moment M. Accordingly, there is a position for the center of gravity of the isolator mass so that the couple substantially cancels moment M. Thus, $$xm_i\ddot{y} \cong xR \cong M$$

The distance $x$ is approximately $L/6$ to $L/4$ from the end of the beam. Thus, by proper proportioning and sizing of the isolator masses, the center of gravity can be located to essentially cancel the moment M whereby the moment transferred to the mount, $M_{mt}$ is much smaller than M.

In accordance with this invention, certain significant advantages are realized. Since losses are minimized, the quality factor, Q, of the beam is greatly enhanced, the nature of the construction of the mount becomes of little significance, the beam is isolated from the mount whereby external vibrations do not adversely affect the beam's vibrations, the beam may be loaded directly along the force measuring input axis and the entire structure may be made from a solid piece of material.

In accordance with another embodiment of this invention as shown in FIGURE 4 of the drawings, a frequency reference apparatus is provided. The frequency reference apparatus 50 constitutes essentially the same components as the apparatus 10 with the exception that only two isolator masses, 52 and 54, are provided and each mass extends completely from one beam support to the other. In this construction, essentially the same isolation is achieved between the beam and apparatus mounts; however, axial stresses, either compression or tension, applied at the end mounts are withstood by the two large isolator masses rather than by the beam 16″. Thus, the beam is also isolated against axial stresses whereby its natural frequency of vibration remains substantially constant even when axial stresses are applied at the mounts.

It should be noted that while the isolation masses are shown as being of rectangular cross section and as extending substantially parallel to the beam, neither is a requirement. To produce an effective cancellation of moments, the masses may be of any cross sectional configuration or any configuration generally and need not extend exactly parallel to the beam, it being required only that the center of gravity of each pair of isolation masses at each end of the beam taken together, be properly located; i.e., that each is either in the plane of the beam or projectable transversely onto the beam. Stated otherwise, while for purposes of convenience in construction, the masses are preferably matched whereby their center of gravity lies within the plane of the beam effective cancellation of moments can be achieved with masses of any pair mismatched, so long as their center of gravity can be projected on the beam.

As stated hereinabove, the isolation system described for use wherein a beam is the basic resonant element can also be applied to a vibrating string resonator. A vibrating string is different from a vibrating beam in that the beam is self-supporting whereas the string is not and requires an initial tension for its operation. Moreover, the end reactions for a string differ from those of a beam in that the string has an end reaction force, R, but no end reaction moment, M. That is $M=0$.

Attenuation of mounting effects for a string can be accomplished in accordance with this invention by correct location of center of gravity of the isolation masses relative to the string. From the preceding discussion of the action of the isolation system, it can be seen that for a string the correct location of the center of gravity of the isolation mass is at such a point that $x=0$. That is, at the attachment of the string to the mass. For this condition, $M=0$ which is required condition for a string.

What is claimed is:

1. An apparatus comprising a member having a longitudinal axis, said member being adapted to vibrate in a plane including said axis; means associated with said member to maintain vibration thereof at a characteristic frequency; a supporting element secured to each end of the member and extending in both directions transversely of said axis of the member; a pair of end mounts; a pair of thin, spaced isolator springs extending between each mount and one of said supports respectively for transmitting axial, forces from said end mounts to said member along the longitudinal axis thereof; a pair of isolator masses secured to each support respectively, one at each end thereof respectively, the center of gravity of each said pair of masses secured to a support being respectively located in plane normal to, said plane of vibration and including said longitudinal axis of said member, said isolator springs and masses being effective to cancel the force and moment restraints produced at said end mounts whereby energy losses from said vibrating member may be prevented.

2. An apparatus according to claim 1 wherein said member is a beam and said masses generally extend along said longitudinal axis for coextensively straddling at least a portion of said beam whereby the center of gravity corresponding to each said pair of masses is located in said plane including said longitudinal axis at a predetermined axial distance from said supporting elements respectively.

3. An apparatus according to claim 1 wherein said member is a string and the center of gravity corresponding to each said pair of masses is located in said plane including said longitudinal axis at the location where said string is secured to each said supporting element respectively.

4. An apparatus according to claim 1 wherein corresponding ones of said isolator masses are integrally connected to each other to form a single pair of masses each one of which extends from one support to the other whereby said isolator masses prevent axial forces from being transmitted to said member.

5. An apparatus according to claim 1 additionally comprising a pair of opposing recesses in each mounting member to form a pair of flexure hinges.

6. An apparatus according to claim 1 wherein said apparatus is made of piezoelectric material.

7. An apparatus according to claim 1 wherein said apparatus is made of quartz.

8. An apparatus according to claim 1 wherein said apparatus is made of metal.

9. An apparatus according to claim 1 wherein said masses are substantially equal in size and mass and are equally spaced from said vibratory member.

10. An apparatus according to claim 1 wherein said masses are substantially equal in size and mass and are symmetrically disposed with respect to said vibratory member and said springs are substantially equal in size and symmetrically disposed with respect to said masses.

References Cited

UNITED STATES PATENTS

| | | | |
|---|---|---|---|
| 3,190,129 | 6/1965 | Kritz et al. | 310—8.4 XR |
| 2,965,866 | 12/1960 | Brown | 73—88.5 XR |
| 3,360,664 | 12/1967 | Straube | 310—9.1 |
| 3,363,456 | 1/1968 | Laimins. | |
| 2,880,333 | 3/1959 | Dranetz | 310—8.4 XR |
| 2,998,535 | 8/1961 | Church et al. | 310—9.1 XR |
| 2,524,579 | 10/1950 | Taylor | 310—8.2 |
| 3,206,986 | 9/1965 | Christensen | 310—25 XR |

MILTON O. HIRSHFIELD, Primary Examiner

B. A. REYNOLDS, Assistant Examiner

U.S. Cl. X.R.

73—88.5; 310—25, 26 8.5; 331—155; 338—47